H. T. STITH.
Traction-Wheels.
No. 138,707. Patented May 6, 1873.
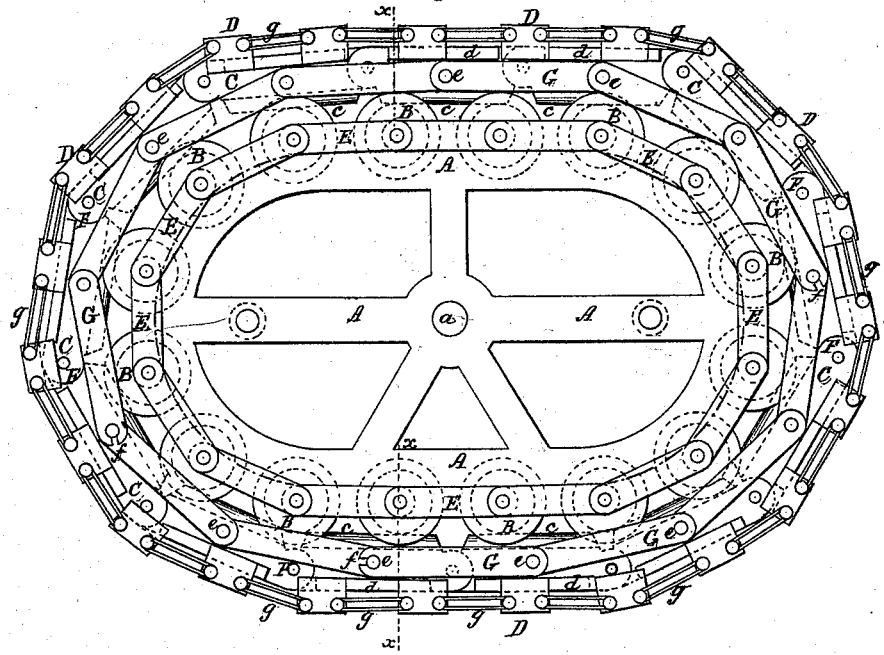
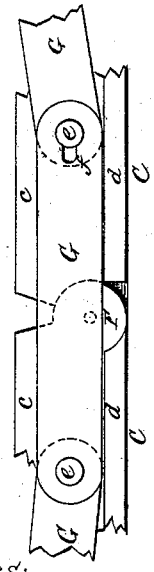
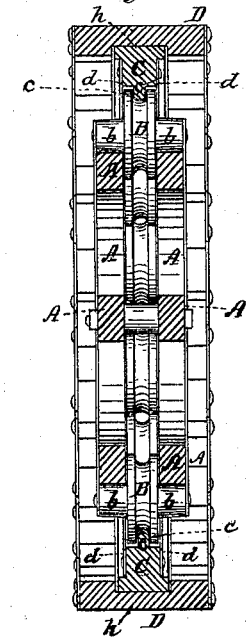
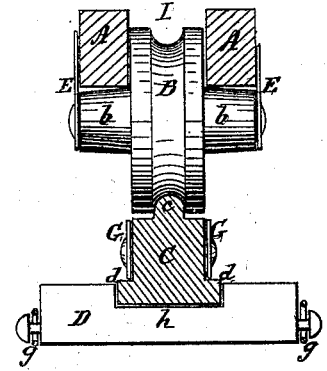
Witnesses:
Inventor:
Henry T. Stith
By Johnson, Klaucke
his Attorneys

UNITED STATES PATENT OFFICE.

HENRY T. STITH, OF PEORIA, KANSAS.

IMPROVEMENT IN TRACTION-WHEELS.

Specification forming part of Letters Patent No. 138,707, dated May 6, 1873; application filed May 2, 1873.

*To all whom it may concern:*

Be it known that I, HENRY T. STITH, of Peoria, in the county of Franklin and State of Kansas, have invented certain new and useful Improvements in Traction-Wheels, of which the following is a specification:

The object of my invention is to dispense with or supersede the necessity of the ordinary supporting and carrying wheels of vehicles in use; and my said invention consists of a single elliptical wheel for use with the ordinary axle-tree, and having a flat tread combined with an endless supporting-track of grooved rollers, a supporting endless track of sections working within the grooves of said rollers, and a bracing-frame of links united to the supporting-track section in a manner to sustain the track section always in a position parallel with the rollers and the straight side of the fixed or axle hub-frame, and thereby produce a level solid surface of track for the rollers to travel upon.

Each elliptical wheel of the vehicle is separate and distinct from the other, and being as complete in itself as the common wheel, as shown in the side elevation, Figure 1, of the accompanying drawing, in which Fig. 2 is a cross-section; Fig. 3, a detached side view of the sectional supporting-track and its bracing-links; and Fig. 4, a cross-section at the line $x\ x$ of Fig. 1.

The wheel consists of an elliptical interior frame or hub, A, which forms the bearing $a$ for the axle, which is secured in the wheel-hub A in any desired manner. This interior hub-frame constitutes the fixed part of the wheel and a support for an endless track of rollers, B, which has a slow traveling motion around said central elliptical hub-frame A in a manner to be hereafter explained. Encircling this endless track of rollers B is an endless supporting sectional track, C, and encircling this is an endless bed-track, D. The wheel, therefore, consists of four parts, the central one, A, only of which being fixed and provided with a groove, I, Fig. 4, or made open to allow the grooved rollers B to travel round the hub-frame A, and be held in position while the axis $b$ of these rollers B must bear upon the outer surface of the hub-frame A, as shown in Fig. 2, the said axis-bearings $b$ being tapered outward from the sides of the rollers B to keep the latter in a true path and avoid rubbing and side friction. They are connected at each end to each other by links E, joined to the end of each axis $b$, so as to keep them the proper distance apart and form their connection. These rollers are grooved, and the endless supporting-track C is provided with suitable bearings $c$ to fit the grooves in the rollers B, as shown in Figs. 2 and 4, and by which the track C is held in place. This supporting-track C is made of sections of suitable length, and joined together by knuckle-joints F, or in any other way. Their outer sides are made broader than the grooved part to obtain side projections $d$ to act in connection with a bracing-frame of links, G, in a way to brace the sections C horizontally and give greater strength to the joints F of the supporting-track. This bracing action is only brought into play when the lower fixed sections of the track C constitute the support for the rollers B of the wheel, in a way which I will now describe. The links G of the bracing-frame are connected to the middle of the length of each section C by pivot-joints $e$, and each link, therefore, crosses each joint F of the sectional track C, and are parallel with the lower sections upon which the wheel rests, so as to bring them against the side projections $d$, and thereby make the links G brace the sections C, and form a stiff and unyielding support along the flat portion of the wheel, and consequently a continuous contact and smooth track of the sections for the rollers, as neither end of the sections, while under pressure, can rise or fall should the ground be uneven, but will be held stiff, and so keep the wheel always of the same form. This is very important, because, were the supporting-sections not so braced, they would be liable to be raised at their ends while under pressure, and thus materially interfere with the movement of the rollers over them. This bracing-frame G is also of very great advantage in relieving the joints F of the supporting-sections C of the strain upon them, and distributes the strain equally between them. The main advantage in the use of this bracing-frame G is its capacity to make rigid and strong the sections which sustain the weight of the vehicle and form the bed of the track. The links G of the bracing-frame are connected to each other, and to the supporting-sections C, in a manner to allow them to lengthen or shorten to conform to the elliptical shape of the wheel. This is done by slots $f$ in one or both ends of each link. In approaching the horizontal portions of the wheel these links G must lengthen to agree with the increased length of the straight or flat portions of the wheel, and as they turn at the rounded ends of the wheel they must shorten to pass through the bends of the wheel, and in this way lengthening simultaneously on its two flat sides and shortening simultaneously in passing its two rounded sides. These bracing-links G also serve to hold the supporting-sections C in position with the rollers, as they pass the rounded sides, by the angular positions of the links, which brings them on both sides of the rollers, as shown in Fig. 1. The platform or bed-support D consists of a series of sills, D, arranged across the supporting-sections C, and united together by links $g$, or other means, so as to hold the sills D a proper distance apart and form an outer revolving bed or track. These sill pieces D are notched at $h$, as shown in Fig. 4, (or otherwise provided with suitable devices,) within which the supporting-sections C fit to hold the traveling-bed D properly in place, and allow the sections to yield at either end without separating them from the sections C, whereby they may easily pass over obstructions and conform to the unevenness of the ground without throwing any of the parts out of position. I have stated that the motion of the rollers B around the fixed frame A is very slow. This is produced by the bearings $b$ of the rollers B against the hub-frame A, being of less diameter than the bearing-portion of the rollers upon the supporting-sections C, while the latter have a rapid motion to carry the hub-frame A along with the vehicle. This slow motion of the rollers is of great advantage in preventing wear and tear of the parts, and lessens the friction. The outer platform D revolves with the supporting-sections C, and always maintains its proper position therewith, and has a slight independent movement, by reason of its connection with the supporting-sections not being fixed, and forming a traction-bearing for the wheel.

If desired, the outer or bed platform of sills and traveling sectional and roller-tracks may be driven by suitable gearing, the cogs of which will interlock with the said sills, and thus drive the traction-wheel and adapt it for use with steam-power.

Having described my invention, I claim—

1. The combination, in an elliptical traction-wheel, of a traveling sectional supporting-track, C, connected by knuckle-joints, for the rollers B, with a bracing-frame of links G forming a part of said sectional support C, and traveling with the same to render rigid and straight the supporting-sections C for the rollers B, essentially as described.

2. In an elliptical traction-wheel, adapted to be supported by a single axle-tree, the traveling bracing-frame of links G, having a capacity to lengthen and shorten to conform to the flat and rounded sides of the elliptical wheel, essentially as described.

3. In a single elliptical traction-wheel, adapted to be supported by a single axle-tree in a fixed hub, A, and having both sectional and roller-traveling supporting-tracks C B, the combination therewith of an encircling traveling-track, D, arranged and operating jointly with the elliptical wheel, essentially as described.

4. In an elliptical traction-wheel, having an outer traveling-track, D, the sills or bed-sections thereof interlocked with the sectional traveling-supports C, to be independent thereof, and to be free to rise and fall vertically to conform to the ground, substantially as described.

In testimony whereof I have hereunto set my hand this 2d day of May, A. D. 1873.

HENRY T. STITH.

Witnesses:
A. E. H. JOHNSON,
J. W. HAMILTON JOHNSON.